Feb. 10, 1970   D. D. BUDWORTH   3,494,575
GROUND AND AIR VEHICLES

Filed April 25, 1966   6 Sheets-Sheet 1

DAVID D. BUDWORTH INVENTOR
BY
ATTORNEYS

DAVID D. BUDWORTH INVENTOR

Feb. 10, 1970  D. D. BUDWORTH  3,494,575
GROUND AND AIR VEHICLES
Filed April 25, 1966  6 Sheets-Sheet 5

INVENTOR
BY DAVID D. BUDWORTH
ATTORNEYS

Feb. 10, 1970     D. D. BUDWORTH     3,494,575
GROUND AND AIR VEHICLES
Filed April 25, 1966     6 Sheets-Sheet 6
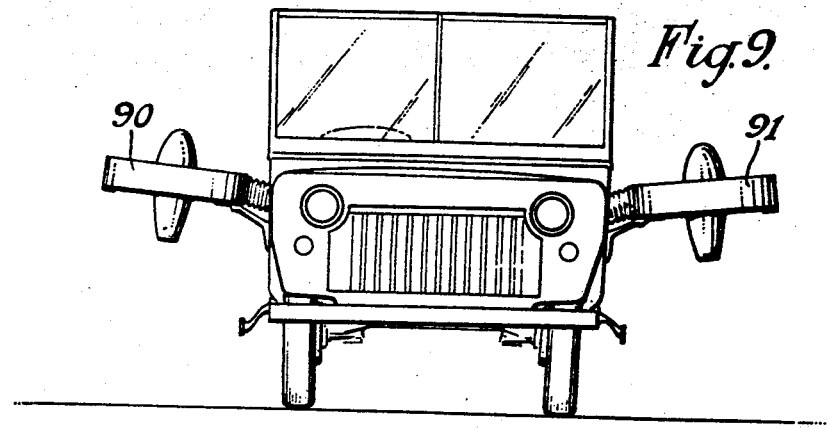
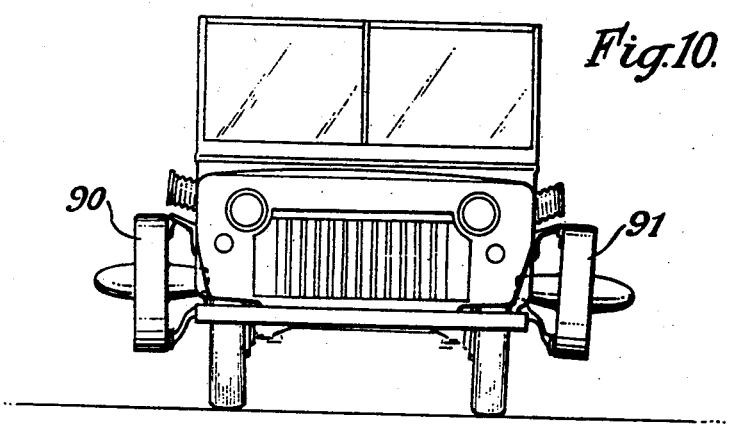
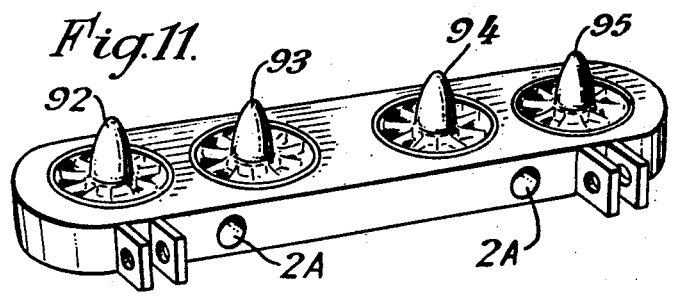
INVENTOR
BY DAVID D. BUDWORTH
ATTORNEYS

United States Patent Office 3,494,575
Patented Feb. 10, 1970

3,494,575
GROUND AND AIR VEHICLES
David D. Budworth, Harwich, Essex, England, assignor to David Budworth Limited, Harwich, Essex, England, a British company
Filed Apr. 25, 1966, Ser. No. 544,722
Int. Cl. B64c 37/00, 29/00
U.S. Cl. 244—2                    13 Claims

ABSTRACT OF THE DISCLOSURE

A ground and air vehicle characterized by the provision of an arrangement of lift fans disposed symmetrically in plan about the center of gravity, each fan being driven by a substantially coaxial gas turbine, the gas turbines being supplied with compressed air from a plenum chamber which forms the main vehicle structure, and the plenum chamber being supplied by prime-mover-driven compressors. Each fan-turbine unit is podded and each pod may be controlled through small thrust angles and may be gyroscopic.

---

This invention relates to flying vehicles. This term is used instead of the term "aircraft," because the object is chiefly (though not necessarily exclusively) the provision of a vehicle which can be used as such on the ground as an automobile, and can fly. The aptitude of the vehicle for one rather than the other function is open to considerable choice: that is to say it may be dominantly an automobile but able to "hop" obstacles and thus surmount cross-country difficulties, or it may be dominantly a flying machine, having reasonably good speed and range as such possibly at the sacrifice of some of its ground-borne attributes.

The invention depends on the use of "lift units." By the term lift unit as used herein, is meant a unit having rotating on an approximately vertical axis a lift fan, discharging downwards within or through suitable duct means which is preferably in the nature of a nacelle or pod; and this fan is driven by a shaft, through any required gearing, by a gas turbine wheel rotating on the same or a parallel axis and therefore passing its working gas in a direction parallel to that of the fan and of which the exhaust is likewise discharged downwards from within the same nacelle or pod. The invention involves the use of a plurality of such lift units and it is a practical advantage that they may be identical, and of fairly simple construction with easily replaceable main components. From a design study it appears to be practicable to make the fan rotor and associated stator structure, and the main turbine components (casing, rotor, and nozzle blading) of plastic, the required temperatures and stresses being compatible by virtue of the provisions of the invention. For certain reasons of control which are enlarged upon below, the rotor system as a whole is preferably such as to have a gyroscopic effect when running and the system is borne in a structure, preferably within the pod which forms its external envelope, which affords pivotal freedom in one plane, though an angle which though small is sufficient to indicate a requirement to control or trim the vehicle.

It can thus be seen that the vehicle depends for lift on the reaction of jet momentum downwards, each lift unit providing in effect, upward jet propulsion or rather, lift. The nature of the lift units is such that high mass-flow jets of reasonably low velocities are used and the mass-flow of each is controllable for two main purposes namely to keep the vehicle in trim, and to incline it as a whole so that a lift component becomes a horizontal propulsion component. Further, the aggregate mass flow of the units may be controllable for ascent and descent.

As the following description of a form of the invention develops so will various features become apparent and the invention resides in certain basic features and combinations of features, as set forth in the appended claims.

The invention resides in features which may be used in combination to afford a practicable flying automobile vehicle, some of which features may be used with other variable features to afford advantageous arrangements.

A vehicle according to the invention may or may not have aerofoil lifting surfaces, and may or may not rely upon ground effect for its sustentation, at least when very near the ground. If such aerofoil lifting surfaces are used then they may be provided with additional control surfaces such as conventional ailerons. So far as the invention is concerned, it exists without regard to any means of sustentation except that which it provides.

In general, according to the invention a flying vehicle comprises a source of power delivered as energised gas, a plurality of lift units arranged symmetrically and in two dimensions so as to afford a stable system (with reference to the centre of gravity of the vehicle) as regarded in plan, a plenum chamber arranged to receive the energised gas, individual gas connections from said chamber to the turbine of each lift unit, and means individual to each lift unit to control the admission of gas from said chamber to such unit.

The plenum chamber is preferably a hollow gas-tight structure forming a frame structure of the vehicle.

Each lift unit, or at least a symmetrically disposed number of the lift units, may comprise a rotor system borne by structure which is pivotally mounted in the vehicle for limited angular gyroscopic movement about a substantially horizontal axis, and means responsive to such movement actuates means to control the lift generated by the unit.

Further, the vehicle as above described, may be provided with operator's control means which (like the conventional control column of an aeroplane) is movable in two dimensions and accordingly controls the admission of gas to (and therefore the individual lift generated by) each controllable lift unit so that control of the attitude of the vehicle about two axes, corresponding to the said two dimensions, is afforded. This provides control in pitch and roll by so doing it also enables the attitude of the vehicle to be selected so that a component of thrust is useful as horizontal propulsive thrust and so (for example by pitching the nose down forward thrust results) to this is propulsion attributable.

The same, or a second, operator's control is provided, preferably with natural up-and-down movement, and this controls the total lift by controlling symmetrically distributed lift units in unison.

The invention further includes provision for re-heat of the gas in the plenum chamber, and therefore between its source and the lift unit turbines. It is here observed that the lift unit turbines are intended to be air turbines, but there may be other gases included; for example re-heat may be by the direct burning of fuel in air in the plenum chamber, or by the admixture with such air of exhaust gas from the prime-mover which is involved in the source of power. Thus it is that the lift unit turbines are referred to as gas turbines.

The source of power may comprise one or preferably a number (say, four) of gas turbine engines driving air compressors delivering into the plenum chamber, or driving such compressors and also supplying bleed air, or driving such compressors and also supplying hot exhaust gas into the plenum chamber. In the simplest version, however, each of several gas turbine engines drives a compressor, and the exhaust of each is emitted through a downwardly-directed exhaust duct which contributes some lift to the vehicle. The prime-mover or movers is preferably used for propelling the vehicle when it is performing as an automobile, and the mechanism by which this is done forms no part of the invention. It will be apparent to skilled readers that such transmission may be to the road wheels by gearing, by further gas turbine, or on turbo-electric lines. Neither is the invention concerned with steering, braking, springing, or other matters proper to the automobile engineer, whose familiarity therewith renders description unnecessary.

The invention will now be described by way of example, with the aid of the accompanying drawings. In these:

FIGURES 9 and 10 and FIGURE 11 show further embodiments of the invention.

Figure 1:
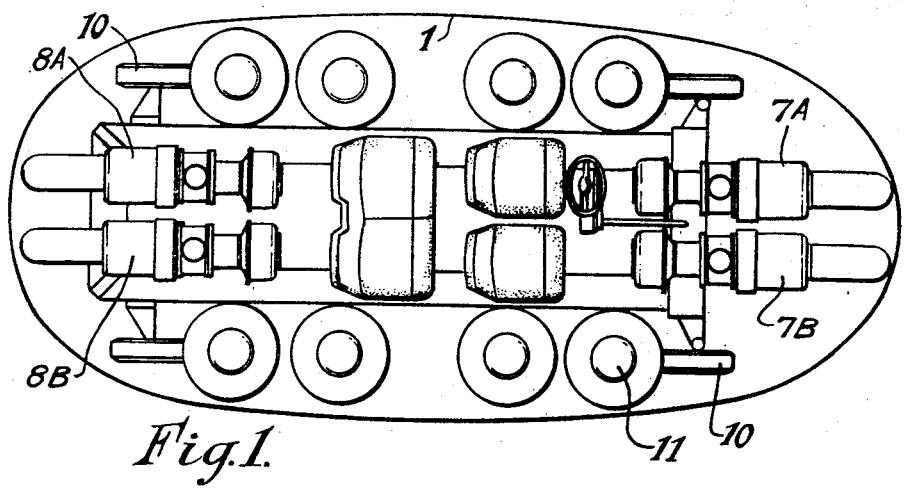
FIGURE 1 is a diagrammatic plan view illustrating the general layout of a vehicle according to the invention having eight lift units energized by four gas turbine engines.
Figure 2:
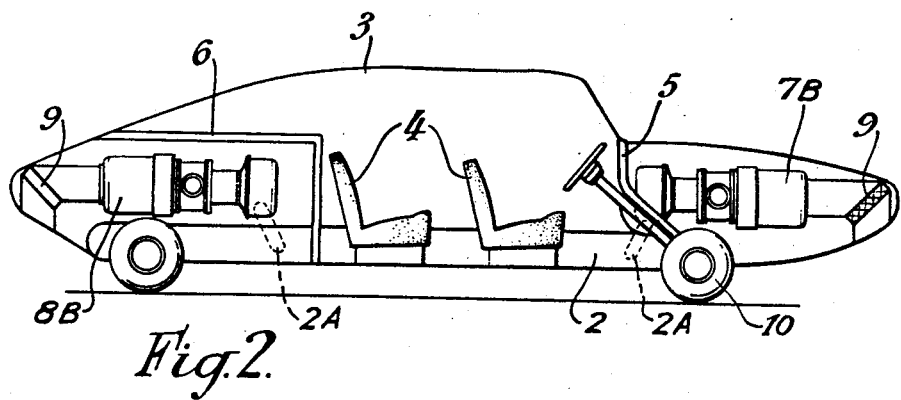
FIGURE 2 is a like view in side elevation.
Figure 3:
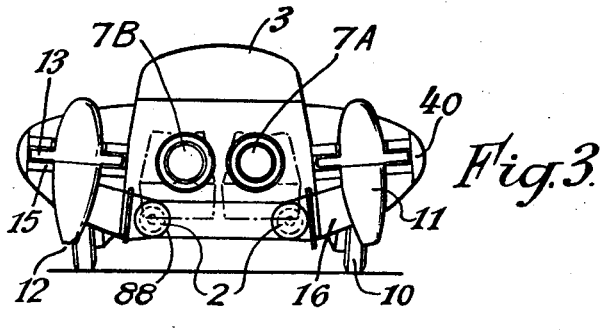
FIGURE 3 is an end view of the same.

Referring first to the general configuration of the vehicle in FIGURES 1, 2 and 3, there is seen within the plan perimeter indicated at 1, that there is a hollow chassis structure built up of light alloy and mainly comprised by tubular members 2 fabricated as a rectangular frame. The body of the vehicle, enclosed by a cabin or saloon top 3, contains seats 4, and it is preferably separated from machinery by bulkheads 5, 6, which can be acoustically insulated and fireproof. Outside the bulkheads there are two forward gas turbine engines 7A, 7B and two aft engines 8A, 8B. Each of these engines has an exhaust which, through a cascade at 9, discharges vertically to afford lift. The final exhaust nozzles may be angularly movable to vector the upward thrust reaction, and there may be further means whereby the exhaust thrust of the engines may be directed forwardly or rearwardly, propulsively to thrust the vehicle, but such variants are not illustrated and are not in themselves part of the invention.

The main primes, movers or engines 7A, 7B and 8A, 8B, which are primarily blowing engines (i.e. gas turbine compressor-driving engines) supply energized air into the plenum chamber constituted by the chassis structure 2 through ducts such as 2A.

The chassis mounts four conventional road-wheels 10 two of which are steered and all are conventionally braked; these wheels are preferably independently sprung and their suspension may have aircraft-like characteristics as to length of stroke, damping, etc., to comply with landing requirements.

Figure 4:
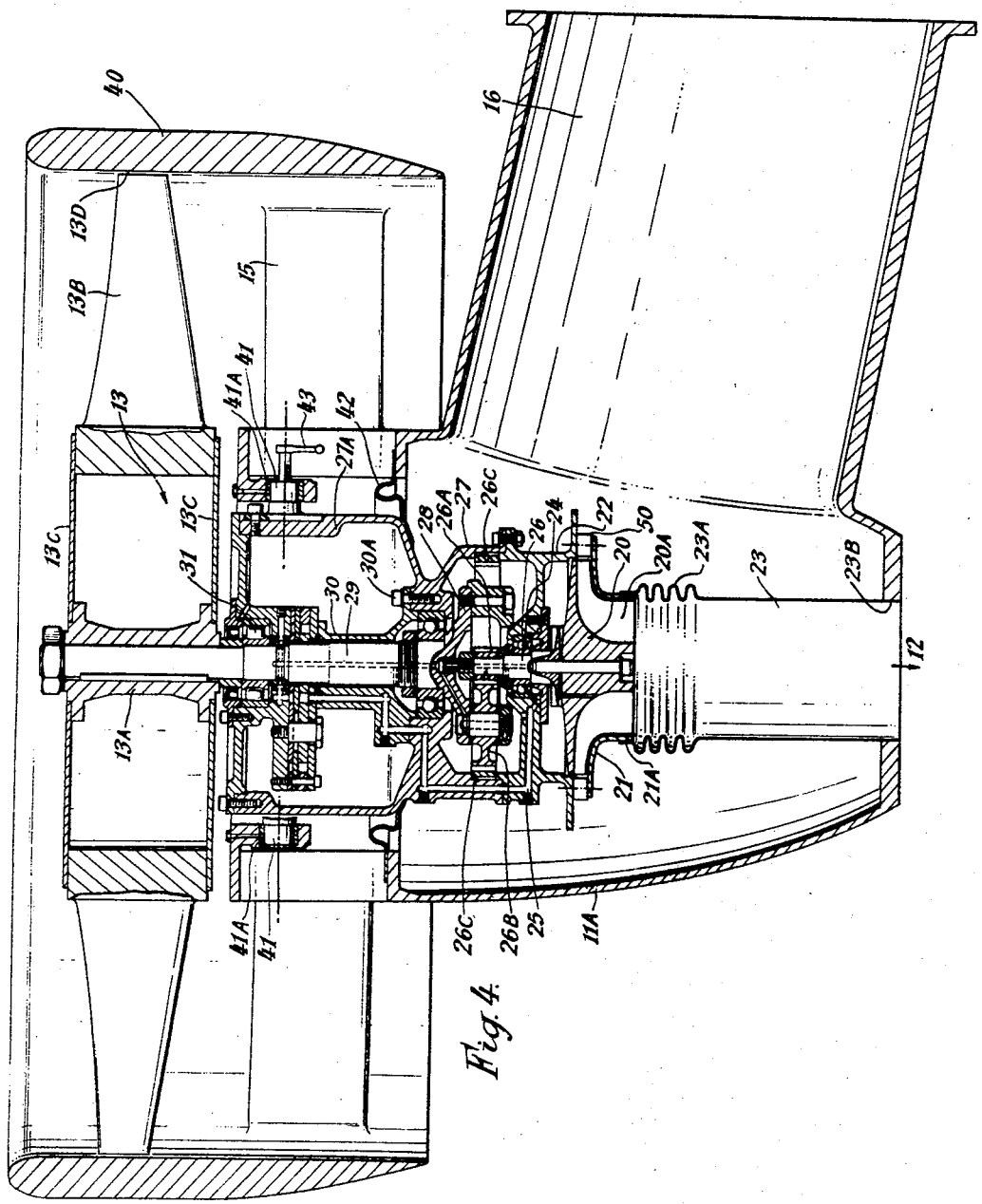
FIGURE 4 is a sectional arrangement of the basic features of a lift unit.

Within the envelope prescribed by the plan perimeter 1 and along each side, outside the chassis structure, there are provided eight lift units (for detailed reference to which, see FIGURE 4). Each of these comprises a pod 11 housing an air turbine and any required reduction gearing, the working air exhausting downwardly at 12. The pods 11 are preferably arranged so that they are somewhat downwardly divergent as can be seen in FIGURE 3, for stability and for control as will be explained. The air turbine of a pod drives a lift fan 13, impelling air downwards to leave through stator blading 15. The working air reaches the air turbines from the plenum chamber through lateral ducting at 16, which may itself be the main supporting structure for the pods. Each such duct may have a valve (not shown), such as a butterfly valve, to isolate a pod in the event of a failure, though the turbine intake guide vanes may—as will be seen—fulfill this function. Surrounding casings of the main engines may be used for the cooling thereof, and by suitable ducting contribute heat to the working air in the plenum chamber.

As will be enlarged upon with reference to the further figures, variation of the fan total head and mass flow is by means of the variable turbine entry guide vanes which are interlinked and operable by means such as hydraulic servo-motor or like actuator means. Such means is preferably both controllable by the driver and automatically controllable, through any suitable relay or transducer system, by signals deriving from gyroscopic reactions responsive to vehicle movements in pitch and roll. If required a yaw gyro may also be provided for directional control, and this may (again relayed) control directional jets, for example bled from the main engines or their exhausts, although a different way of controlling yaw is described below.

The road wheels 10 may be driven from the main engines, and one convenient and light way of doing this, not illustrated and not forming part of the invention, is to provide each wheel with an air turbine deriving working air from the plenum chamber.

Referring now to the remaining FIGURES 4–8 the lower part 11A of a pod (11 of FIGURES 1–3) is seen to be rigid with a robust branch 16 being one of the lateral ducts from the plenum chamber. Within the part 11A is contained a turbine comprising an inward-flow radial turbine wheel 20 with its rotor vanes 20A housed between casing elements 21, 22. Casing element 21 is continued axially and downwardly at 21A, to join turbine exhaust duct 23, to which it is joined by a flexible tube section 23A. The duct 23 is gas-tight at 23B with the lower end of pod 11A. The turbine casing element 22 forms an integral part of a reduction-gear and bearing housing. This housing contains an overhung turbine ball-bearing at 24 supported concentrically by the casing element 22, conventional lubricant provision being made, as by oil ducting 25. The turbine wheel 20 is attached to a quill shaft 26 (running in the bearing 24) upon which is a gear driver pinion 26A engaging planet pinions 26B which run in orbit within internally toothed ring 26C. The ring 26C is fixed within gear casing 27 which is, in effect, an upward extension of the turbine casing element 22. The planet pinions 26B are borne by rotatable planet cage 28 which is one with the turbine output shaft 29. Shaft 29 is enclosed by an upward tubular extension 30 of casing 27, and above that is borne by a roller bearing 31 supported in an outer upward extension 27A of casing 27. For constructional and assembly reasons the extension 30 is fabricated separately from casing 27 and attached thereto by studs as at 30A; but extension 27A is, as shown, integral with casing 27.

Above the bearing 31 the shaft 29 extends, overhung from the bearing, and to it is keyed the fan 13 of the lift unit. This comprises an inner hub 13A, and fan blades 13B, interattached by hub plates 13C. The hub 13A and plates 13C are preferably of metal whilst the blades 13B, moulded separately or as an integral ring, are of plastic. The fan runs, with no more than adequate tip clearance (at 13D) within a fixed shroud ring 40 of reasonably low-drag aerodynamic profile. This ring 40 is supported by fan stator blading 15, extending from the structure of the pod 11.

The whole turbine-fan unit is mounted in the fixed pod structure, by coaxial trunnions at 41, which project from the casing 27A and are borne for small angular movement relative to the pod 11, in bearings 41A. The casing 27A is, moreover, sealed to the wall of the pod 11 by a flexible membrane at 42. It can now be seen that compressed air or gas from the plenum chamber charges the inside of the lower part 11A of the pod, thus entering the turbine between the turbine casing parts 21 and 22. Such air or gas is contained by the seal at 23B and the membrane at 42, whilst the rotor unit and its gearing have limited freedom to rock angularly on the trunnions 41. It will be noted that one of the trunnions 41, has a lever arm 43 mounted on it, the purpose of which will be made clear below.

Figure 5:
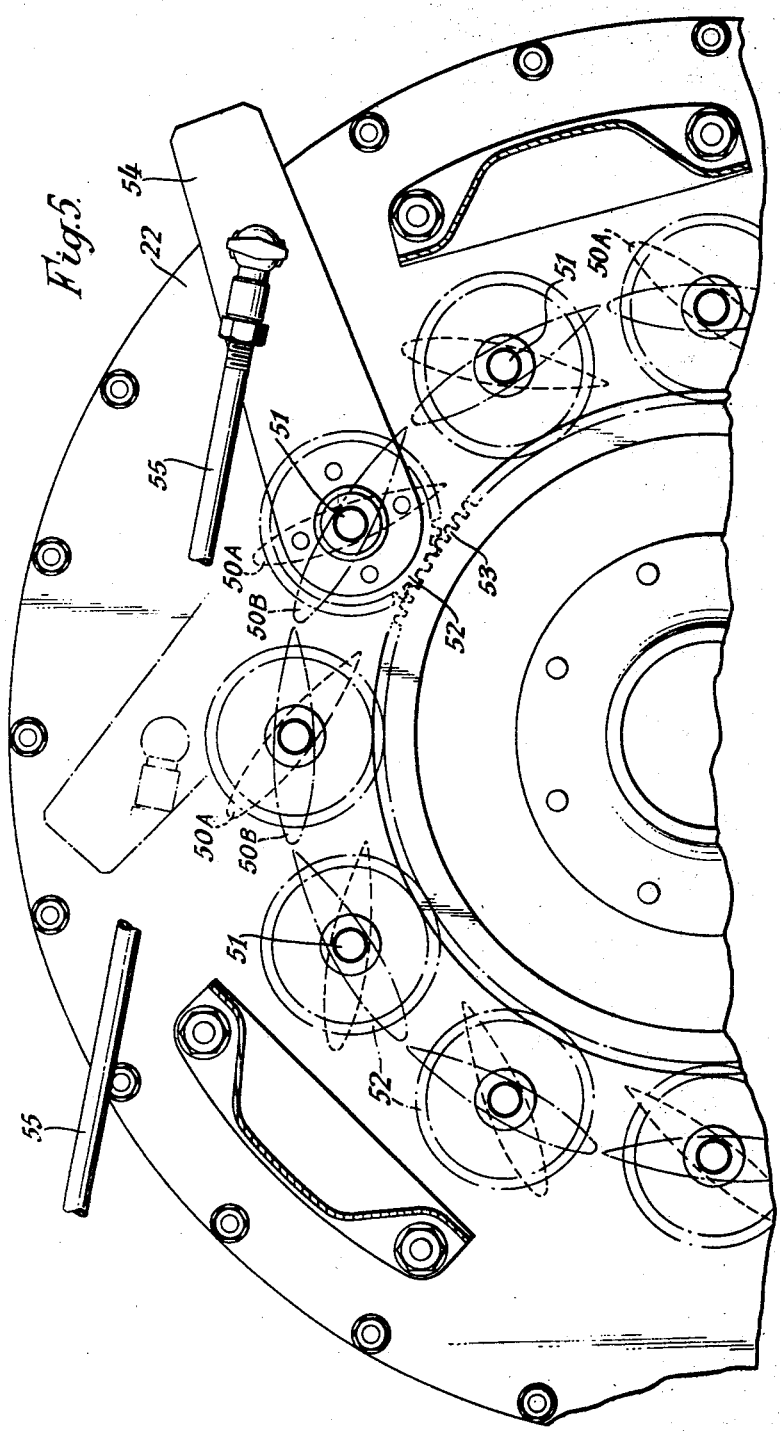
FIGURE 5 is a view on a larger scale showing the variable intake guide vanes of FIGURE 4.
Figure 6:
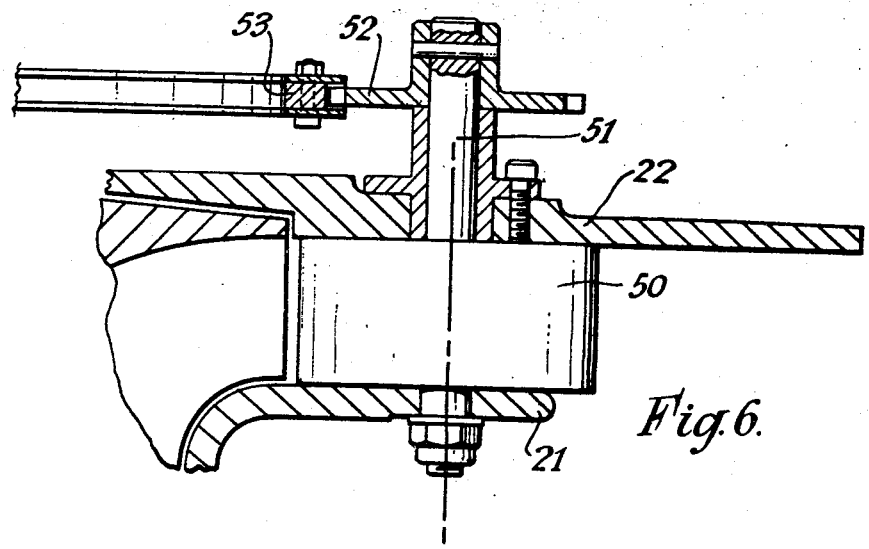
FIGURE 6 is a fragmentary view approximately in the scale of FIGURE 5, illustrating another aspect of a nozzle guide vane and its control mechanism.

The fan 13 delivers a downward stream of air which flows along the pod 11 and, at the lower end thereof is joined by the exhaust of the turbine. The reaction of the jet momentum so caused, is the lift. Clearly the power developed by the turbine 20 is a function of the rate of flow through it. It is recognised that the power output of an inward-flow radial turbine is controllable by means of its intake nozzle guide-vanes. Such vanes are indicated at 50 in the drawings, and they lie between the two turbine casing elements 21 and 22. FIGURES 5 and 6 show better, the guide-vane arrangement. For clarity, certain parts of this are not shown in FIGURE 4.

Each guide-vane 50 is carried on a pivot pin 51 which is rotatable in bearings in the elements 21, 22 and which extends upwards from element 22. The upper end of each pin 51 has, fixed with it, a pinion or a quadrant of a pinion 52 (indicated in broken line in FIGURE 5 and section in FIGURE 6). The pinions 52 all engage a toothed ring 53 which encircles the element 22 and is supported by the pinions 52 collectively. One "master" pinion 52 is rotatable by a lever arm 54 which is fixed either to that pinion or to its pin 51. Movement of the lever 54 clearly causes rotation of all the pinions 52 and therefore of all the vanes 50. This movement is between a limiting "open" vane position shown as at 50A in FIGURE 5, and a limiting "closed" position as at 50B. As drawn and for clarity, the distance between the leading edge of one vane 50 and trailing edge of its neighbour is somewhat exaggerated; in practice the clearance (in the 50B condition) will be very small, or the vanes 50 may even overlap in contact, forming in effect a virtually complete cut off of the gas entering the turbine. The limiting "open position," is that in which the vanes have their optimum swirl angle for the full-load operating condition of the turbine.

In the following disussion of controls it is therefore to be understood that the lift generated by each lift unit is individually controlled by moving its guide vanes, and if it be required to shut off a lift unit completely (e.g. when the vehicle is ground-borne) the vanes are "closed" as at 50B (and may be closed in the event of a failure of an individual lift unit). The lever 54 is moved by an articulated link connection indicated at 55.

Before discussing the control system, it may now be emphasized that as seen in FIGURE 1, the left units are arranged, as seen in plan, symmetrically approximately about the centre of gravity of the whole vehicle and arrayed in two dimensions, and symmetrically as to the fore-and-aft centre line of the vehicle and likewise as to the median transverse centre line (it is assumed that these centre lines intersect in the region of the centre of gravity). As already observed the units are mounted so that their near-vertical axes are slightly downwardly divergent (as seen in FIGURE 3). It is also to be mentioned here that although the total lift, namely the sum of the lifts of all the units (and any additional lift from the exhaust 9) may be controllable by controlling the output of the prime movers, it is also possible to control it by collectively controlling the left units by their guide vanes. Indeed, a possible way of doing this will be described, in reference to FIGURE 8.

Figure 7:
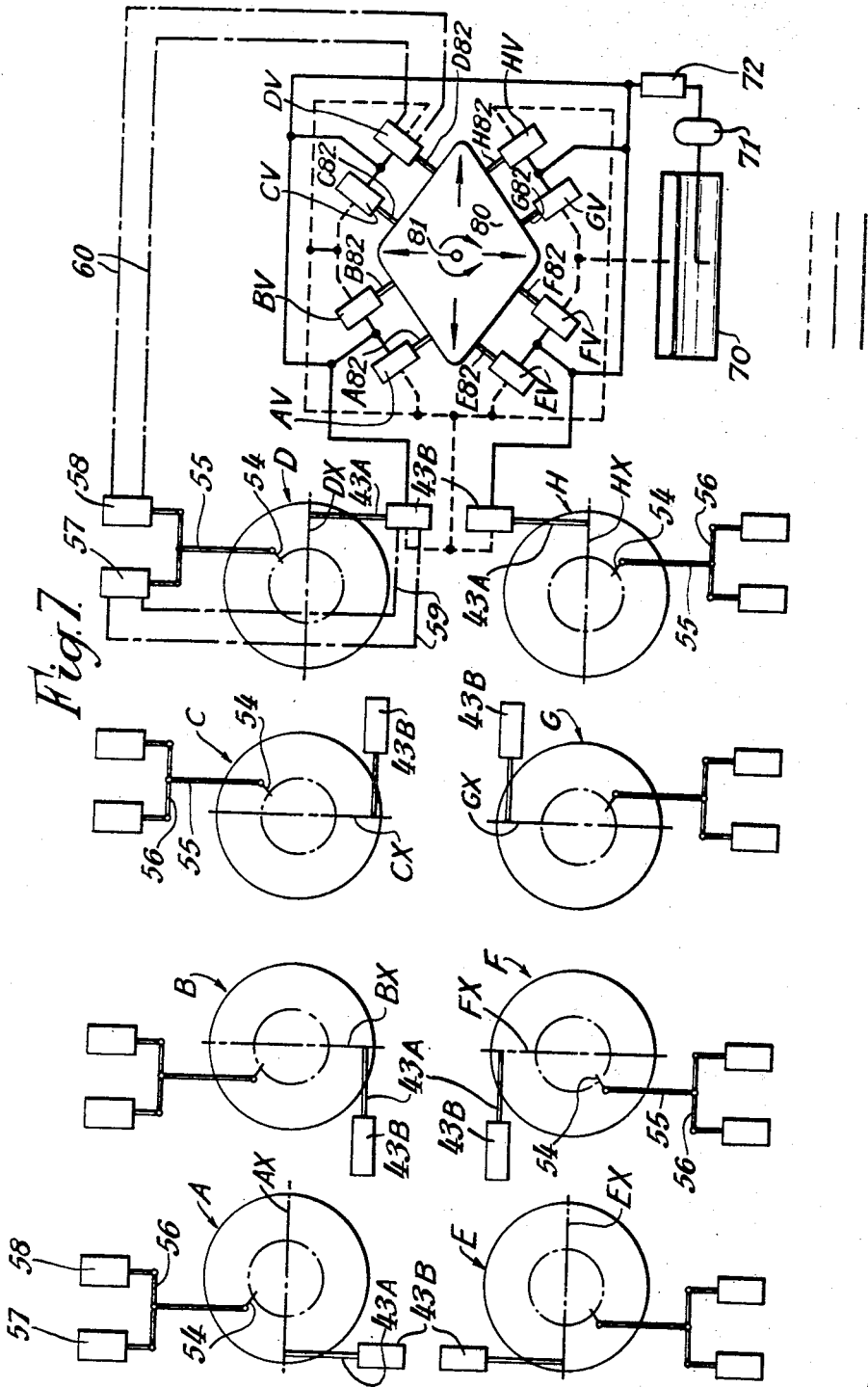
FIGURE 7 is a diagram, showing features of the lift unit control system with a key to the lineation used.

Now, however, reference is made to FIGURE 7. Here the eight lift units of FIGURE 1 are diagrammatically represented and referenced A to H. The axis of the trunnions (41 of FIGURE 4) of each unit, is indicated by a line AX, BX, CX, DX, EX, FX, GX and HX. The four units A, D, E, H, have their axes AX, DX, EX, HX, fore-and-aft in the vehicle, whilst the axes BX, CX, FX and GX lie athwartships. It is also possible for the first-mentioned axes to lie athwartships and the second-mentioned axes to lie fore-and-aft. The guide vane levers 54 of each unit, appear in FIGURE 7 diagrammatically, as do their operating rods 55. The trunnion levers or arm 43 of each unit (not indicated in FIGURE 7) is connected articularly by a rod 43A to a spool or similar gyro valve, indicated at 43B at each unit. The valves 43B are consequently operated by the gyroscopically-caused angular movements of units about the axes AX, BX, CX, DX, EX, FX, GX, HX and it will be observed that the rods 43A are orientated to correspond with the orientation of the axes AX, BX, CX, DX, EX, FX, GX, HX.

In FIGURE 7, the key shows dot lines, dash-dot lines, and full lines. These represent respectively hydraulic connections of return or virtually zero pressure, two-way working pressure, and pump pressure.

A reservoir 70 supplies hydraulic fluid to a pump 71 which feeds the control system through a filter 72. Each control rod 55 is connected through a differential lever 56 to two hydraulic actuators or jacks 57, 58, which are conventional double-acting ram type actuators. Supply lines 59 to the jacks 57, are only illustrated in relation to unit D (those of other units all being similary connected) to the respective gyro valve 43B. Rocking of unit D about its axis DX is sensed by the respective valve 43B which thereupon causes actuation of its respective jack 57 which, via 56, 55, opens or closes the guide vanes of unit D. All other units A–H behave likewise.

Jack 58 of each unit is connected by lines 60 to a corresponding manual control valve. An array of eight such valves, marked AV, BV, CV, EV, FV, GV, HV is indicated. Each such valve is, again, a conventional spool valve, receiving pressure fluid from pump 71 by pressure line, returning fluid to the reservoir 70 by return line, and when manually displaced diverting pressure fluid to one or other side of the respective jack by one or other of the working-pressure lines. Thus for example valve DV controls the jack 58 of unit D. Each valve AV to HV controls a corresponding jack of each unit A to H.

It is thus apparent that the lift generated by each lift unit individually is controlled (by the movement of its intake guide vanes) in accordance with the response both of its individual gyro valve 43B, and of the corresponding manually operated valve.

Figure 8:
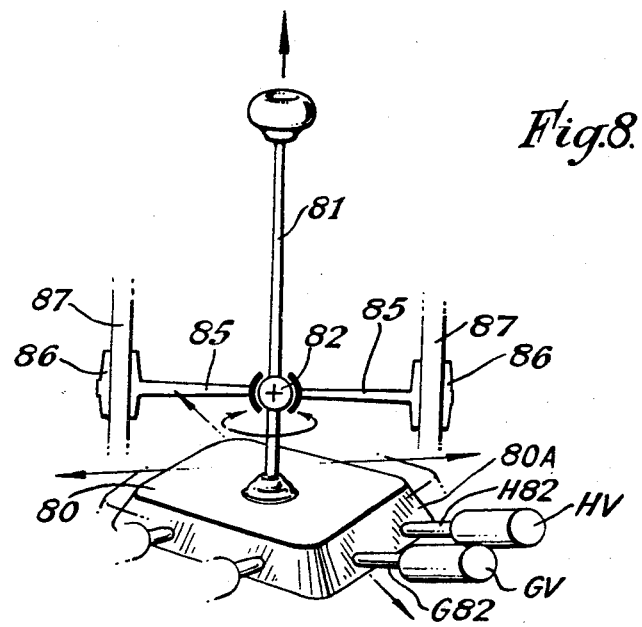
FIGURE 8 is a diagrammatic illustration showing, notionally, how overall lift control can be applied in the system of FIGURE 7.

The way in which manual valve operation is achieved will now be described. It will be seen in FIGURE 7 that the valves AV, BV, CV, DV, EV, FV, GV, HV are arranged in a symmetrical manner around a diamond-shaped element 80 and this element (as reference to FIGURE 8 shows) is carried at the bottom of a control column 81 which is universally articulated, as by a ball-joint support 82, in which the column 81 is also rotatable about its own longitudinal axis. Each valve AV, BV, CV, DV, EV, FV, GV, HV has a projecting spring-loaded rod A82, B82, C82, D82, E82, F82, G82, H82 rigid with its spool. The inwardly directed ends of these rods bear on the four facets of the element 80, under the influence of the springs, all of them being somewhat offset in alignment from the centre of the element when the column 81 is attached.

Assume the vehicle to be in flight and consider first, the affect of the operator pushing the control column straight forward. This moves the element 80 backward and the rods A82, B82, E82 and F82, are pushed. Their corresponding valves AV, BV, EV and FV are consequently so shifted as to open the nozzle guide vanes of units A, B, E and F thereby increasing their lift; and the opposite effect on valves CV, DV, GV and HV reduces the lift of units C, D, G and H. The vehicle, consequently pitches forwardly, the total lift now has a forwardly propulsive thrust component, and the vehicle moves forward. Reverse movement of the column 81 will correspondingly cause "negative" thrust, to retard and ultimately reverse the vehicle.

Now if the collumn 81 be pressed sideways, say to starboard, the rods of the valves AV, BV, CV and DV are pushed, whilst the rods of EV, FV, GV and HV are relaxed. The consequence is to increase the collective lift of units A to D and decrease that of F to H and the vehicle is banked in the rolling plane, to starboard; the overall lift has a thrust component to starboard and the vehicle will move laterally to starboard. Conversely, similar effect is achievable to port.

Thus the two-dimensional angular movements of the control column achieves control of the attitude of the vehicle in two planes and thus, in turn, its motion in two horizontal dimensions.

Now consider control in yaw. This is achieved by rotating the column 81, rather in the manner of an ordinary vehicle steering wheel. Rotation clockwise (as viewed in FIGURE 1 or 7) of the column 81 and therefore of the element 80, results in the rods of adjacently paired valves, such as AV and BV or EV and FV, being alternatively pushed and relaxed. Due to the diamond shape of the element 80, the rod which is pushed (in this case, AV or HV) is shifted further than is the rod of BV or GV. Therefore the thrust of unit A is increased substantially by more than B is decreased, and that of H is increased by more than the decrease of G. It is also the case that, by the same rotation of element 80, shift of DV and of EV is more than (opposite) shift of CV and FV. Consequently although the lift of unit C increases, that of D decreases more; and likewise though F increases, E decreases more.

Recalling that all the lift units are disposed slightly divergently (FIGURE 1) the net effect of the foregoing differential lift control is to produce a yawing couple to starboard when the column 81 is turned in the starboard hand (and of course, conversely to port).

The disposition of controls therefore affords the operator, control in pitch, roll and yaw.

In addition to the manual control, the gyroscopic effect of the rotor of each lift unit, sensed by the valves 43B and responded to by the jacks 57, affords automatic stability of the vehicle, because any angular-movement disturbance of the vehicle in pitch or in roll results in a restoring adjustment of the lift of individual units. Units A, D, E and H are responsive to roll and B, C, F and G to pitch.

Now, as to control of lift (in the "VTOL" sense) there are various ways in which this may be achieved. The simplest is, perhaps, merely to control the power output of the prime movers and thus the plenum chamber pressure, in turn the power output of the lift unit turbines and finally that of their fans. This, however, may involve considerable time lags and be insufficiently sensitive, for example, for gentle landing. It is therefore proposed to provide an arrangement which is diagrammatically shown in FIGURE 8.

In this figure the element 80 is shown as having its facets, against which bear the valve rods A82, B82, C82, D82, E82, F82, G82, H82 formed as bevelled faces. Now if the element 80 be raised, all the valve rods collectively will be pushed and if the element 80 is lowered they are all relaxed. This can be achieved by mounting the stationary part of the ball mounting 82, as by arms 85, on slides 86 which can move vertically on guides 87. Now merely lifting or lowering the column 81 obviously lifts or lowers the element 80. Thus all valves AV–HV are shifted in the sense to increase the lift of all lift units without disturbing the three-axis manual control functions described above). The vehicle therefore rises; reverse (lowering) movement of column 81 of course results in reducing lift and the vehicle descends.

To afford extra lift, reheat may be applied by means of a conventional reheat combustion chamber such as 88.

As previously mentioned the air in the plenum chamber may be heated by waste heat from the prime movers. However any of the well known combustion heaters may be used, or a slow-burning solid combustible may be fired in the plenum chamber. Indeed this last expedient may be provided for, for use in emergency should there, for example, be a failure of the main power source. Whatever is used should, however, be incapable of raising the plenum temperature to a degree intolerable to the lift unit turbines.

In another embodiment of the invention, shown in FIGURES 9 and 10, the lift units 90 and 91 and associated plenum chamber can be hinged and folded downwards when not in use. FIGURE 9 shows the "flight" position and FIGURE 10 the "stowed" or folded position.

In a further embodiment, portable lift units can be used. One such arrangement is shown in FIGURE 11, the assembly of four lift units 92, 93, 94 and 95 being arranged to bolt onto the sides of a suitably adapted vehicle. Gas enters the units through ducts such as 2A.

I claim:
1. A flying vehicle comprising, in combination,
   a structure forming a plenum chamber,
   a plurality of prime movers mounted on said structure and supplying said plenum chamber with compressed air when the vehicle is flying,
   a plurality of at least three planwise symmetrically grouped turbines on substantially vertical axes spaced laterally from the center of gravity of the vehicle each being operated by compressed air from said chamber,
   individual lift fans driven by each said turbine the airflow therethrough being directed along the same axis as the airflow through the corresponding turbine, each said turbine being mounted on a substantially vertical turbine shafe and each lift-fan being mounted on a fan shaft substantially coaxial with the corresponding turbine shaft, and in which there is reduction gear drivingly connecting each turbine shaft to its corresponding fan shaft, unitary casing means housing each said turbine, and bearing means for said turbine and its corresponding fan, driving connecting means between the turbine and fan shafts, and inlet nozzle guide-vane means associated with said turbine, all supported by said casing means, said casing means being pivotally mounted in the vehicle so that said turbine and corresponding fan are tiltable relative to the vehicle.

2. A vehicle as defined by claim 1, wherein each lift-fan having blades extending radially beyond the maximum diameter of said pod-like body is located towards one end thereof, and fixed stator vanes are provided to cooperate with said fan extending correspondingly.

3. A flying vehicle comprising, in combination,
   a body having a closed chamber forming a chassis,
   road wheels mounted on said chassis for supporting and guiding the vehicle in an operational mode thereof,
   means for supplying said chamber with pressurized fluid,
   a plurality of turbines mounted on said body in planwise symmetrical relation with respect to the center of gravity of the vehicle, and a lift fan directly coupled to each turbine, the axes of said turbines and fans being substantially vertically disposed, each fan including an annular shroud and a rotor within said shroud, and each turbine-fan arrangement being disposed outboard of said closed chamber whereby said shrouds discharge air downwardly directly to ambient atmosphere, and
   conduit means connecting said turbines to said chamber for rotation by the pressurized fluid within the chamber.

4. A vehicle according to claim 3, in which each said turbine has controllable inlet nozzle guide-vanes.

5. A vehicle according to claim 3, in which each said turbine is an inward-flow radial turbine.

6. A vehicle according to claim 3 in which each said turbine has controllabe inlet nozzle guide vanes, further comprising pilot-operable control means, servomotor means selectively controllable by said control means, and connection between such servomotor means and the guide vanes of individual turbines.

7. A vehicle according to claim 3, in which each of the turbines is mounted in a unitary structure with its corresponding lift fan, each such structure is pivotally mounted in the vehicle, and there is pilot-operable means adapted to control pivotal movement of each such structure.

8. A vehicle according to claim 3, in which each of the fans is arranged so that its axis and therefore direction of individual lift is normally in small degree offset from vertical and convergent with the individual lift of the other fans, whilst the collective lift of all the fans is normally resolved vertically.

9. A vehicle according to claim 3, having road wheels steering, and transmission arranged and adapted to be used according to conventional automobile practice, all attached to the closed chamber structure.

10. The vehicle according to claim 3 including means for individually controlling the fluid supplied from said closed chamber to each turbine, whereby the thrust supplied by the individual turbine-fan arrangements is selectively controllable.

11. A vehicle according to claim 3, in which each said turbine is mounted on a substantially vertical turbine shaft and each lift-fan is mounted on a fan shaft substantially coaxial with the corresponding turbine shaft, and in which there is reduction gear drivingly connecting each turbine shaft to its corresponding fan shaft.

12. A vehicle according to claim 3, having road wheels and steering arranged and adapted to be used according to conventional automobile practice and attached to said chassis, said means for supplying said chamber with pressurized fluid comprising gas turbine prime mover means from which power is derived to drive said road wheels.

13. A vehicle according to claim 12 in which said prime mover means are turbines, and in which there is further provided means whereby the exhaust efflux thereof is finally directed substantially vertically downwards to produce lift reaction.

References Cited

UNITED STATES PATENTS

| | | | |
|---|---|---|---|
| 3,388,878 | 6/1968 | Peterson et al. | 244—12 X |
| 3,045,953 | 7/1962 | Eggers et al. | 244—23 X |
| 3,084,888 | 4/1963 | Hertel | 244—56 X |
| 2,501,078 | 3/1950 | Newcomb | 244—15 |
| 2,715,814 | 8/1955 | Barr | 60—39.25 X |
| 2,974,900 | 3/1961 | Morris et al. | 244—12 |
| 3,033,492 | 5/1962 | Rowe | 244—52 X |
| 3,073,552 | 1/1963 | Messerschmidt | 244—12 X |
| 3,095,165 | 6/1963 | Rowe | 244—12 |
| 3,115,318 | 12/1963 | Caillette. | |
| 3,120,622 | 2/1964 | Curtis et al. | 244—12 X |
| 3,176,934 | 4/1965 | Kappus | 244—12 |
| 3,203,645 | 8/1965 | Shaw | 244—23 |
| 3,282,053 | 11/1966 | Messerschmidt | 60—226 X |

MILTON BUCHLER, Primary Examiner

J. L. FORMAN, Assistant Examiner

U.S. Cl. X.R.

244—7, 12, 23, 56